(12) United States Patent
Adams

(10) Patent No.: US 9,261,951 B2
(45) Date of Patent: Feb. 16, 2016

(54) SYSTEMS AND METHODS FOR MANAGING SECURITY DATA

(71) Applicant: U.S. Security Associates, Inc., Roswell, GA (US)

(72) Inventor: Wesley C. Adams, Bath, ME (US)

(73) Assignee: U.S. Security Associates, Inc., Roswell, GA (US)

( * ) Notice: Subject to any disclaimer, the term of this patent is extended or adjusted under 35 U.S.C. 154(b) by 174 days.

(21) Appl. No.: 13/671,215

(22) Filed: Nov. 7, 2012

(65) Prior Publication Data

US 2013/0117674 A1     May 9, 2013

Related U.S. Application Data

(60) Provisional application No. 61/556,608, filed on Nov. 7, 2011.

(51) Int. Cl.
*G06F 3/01*     (2006.01)
*G06F 21/00*    (2013.01)

(52) U.S. Cl.
CPC . *G06F 3/01* (2013.01); *G06F 21/00* (2013.01)

(58) Field of Classification Search
None
See application file for complete search history.

(56) References Cited

U.S. PATENT DOCUMENTS

| | | | | |
|---|---|---|---|---|
| 5,285,494 A | * | 2/1994 | Sprecher et al. | 455/423 |
| 5,999,179 A | * | 12/1999 | Kekic et al. | 715/734 |
| 7,315,826 B1 | * | 1/2008 | Guheen et al. | 705/7.29 |
| 7,936,262 B2 | * | 5/2011 | Derrick et al. | 340/539.13 |
| 2002/0129221 A1 | * | 9/2002 | Borgia et al. | 712/1 |
| 2004/0064351 A1 | * | 4/2004 | Mikurak | 705/7 |
| 2004/0073868 A1 | * | 4/2004 | Easter | G06F 17/2785 715/225 |
| 2004/0128186 A1 | * | 7/2004 | Breslin et al. | 705/10 |
| 2004/0162844 A1 | * | 8/2004 | Thome | G06Q 10/08 1/1 |
| 2004/0267595 A1 | * | 12/2004 | Woodings et al. | 705/9 |
| 2005/0223392 A1 | * | 10/2005 | Cox et al. | 719/328 |
| 2007/0033129 A1 | * | 2/2007 | Coates | 705/36 R |
| 2008/0077446 A1 | * | 3/2008 | Korpman et al. | 705/3 |
| 2010/0023865 A1 | * | 1/2010 | Fulker et al. | 715/734 |
| 2010/0228599 A1 | * | 9/2010 | Mamorsky | G06Q 10/00 705/7.36 |
| 2011/0113360 A1 | * | 5/2011 | Johnson et al. | 715/771 |
| 2011/0126111 A1 | * | 5/2011 | Gill et al. | 715/736 |
| 2012/0254048 A1 | * | 10/2012 | Roberts | G06Q 10/0637 705/317 |
| 2012/0317507 A1 | * | 12/2012 | Gutierrez et al. | 715/771 |

* cited by examiner

*Primary Examiner* — Matt Kim
*Assistant Examiner* — Tuan S Nguyen
(74) *Attorney, Agent, or Firm* — Sutherland Asbill & Brennan LLP

(57) ABSTRACT

Certain embodiments of systems and methods for managing security data are provided. In one embodiment, a system can be provided. The system can include at least one processor operable to execute one or more computer-executable instructions. The system can also include at least one memory operable to store the one or more computer-executable instructions. The instructions can be operable to: collect status information associated with a plurality of sites monitored by a security service provider; generate, based at least in part upon the collected information, at least one graphical presentation associated with the plurality of sites, the at least one presentation comprising one or more respective selectable status indicators associated with each of the plurality of sites; and output, by the monitoring system, the generated at least one presentation.

20 Claims, 4 Drawing Sheets

| Name | Emp # | Office | Consent Form |
|---|---|---|---|
| Guard 1 | 123456 | 111 | On File |
| Guard 2 | 234567 | 111 | On File |
| Guard 3 | 345678 | 111 | On File |
| Guard 4 | 456789 | 111 | On File |
| Guard 5 | 567891 | 111 | On File |
| Guard 6 | 678912 | 111 | On File |
| Guard 7 | 789123 | 111 | On File |
| Guard 8 | 891234 | 111 | On File |
| Guard 9 | 912345 | 111 | On File |
| Guard 10 | 812345 | 111 | On File |
| Guard 11 | 712345 | 111 | On File |
| Guard 12 | 612345 | 111 | On File |
| Guard 13 | 512345 | 111 | On File |
| Guard 14 | 412345 | 111 | On File |
| Guard 15 | 312345 | 111 | On File |
| Guard 16 | 212345 | 111 | On File |
| Guard 17 | 112345 | 111 | On File |
| Guard 18 | 012345 | 111 | On File |
| Guard 19 | 098765 | 111 | On File |
| Guard 20 | 987654 | 111 | On File |

SYSTEMS AND METHODS FOR MANAGING SECURITY DATA

RELATED APPLICATION

This application claims priority to U.S. Ser. No. 61/556,608, titled "Systems and Methods for Managing Security Data," filed on Nov. 7, 2011, the contents of which are hereby incorporated by reference.

FIELD OF THE DISCLOSURE

Embodiments of the disclosure relate generally to security monitoring, and more particularly, to managing and presenting data associated with a plurality of monitored sites.

BACKGROUND OF THE DISCLOSURE

It is well known and quite common for commercial and industrial premises to be protected by security companies providing on-site security guards as a service. A security company typically employs and trains guards, who are assigned to patrol the premises of customers of the security company. To ensure that the premises are protected, each guard is often responsible for thoroughly and regularly patrolling all or part of the premises. During guard tours, a wide variety of different data associated with the monitored premises may be collected, such as checkpoint data and data associated with identified alert conditions.

The security company is typically responsible for hiring, training, and retaining the security guards. The security company may also be responsible for ensuring that appropriate employment forms are obtained and background checks are performed. Additionally, the security company is typically responsible for ensuring that an appropriate business relationship has been established with its customers and that appropriate billing and/or review procedures have been put in place.

Indeed, a wide variety of different information may be available in association with a monitored site. It may be difficult for the security company and the customers of the security company to review various information in order to identify any potential problems associated with the monitored site. Accordingly, there is an opportunity for improved systems and methods for managing security data associated with any number of monitored sites.

SUMMARY

Embodiments of the disclosure can include systems and methods for managing security data. Certain embodiments can include systems and methods for managing and presenting data associated with a plurality of monitored sites.

In one embodiment, a computer-implemented method can be provided. The method can include collecting, by a monitoring system comprising one or more computers, status information associated with a plurality of sites monitored by a security service provider. The method can further include generating, by the monitoring system based at least in part upon the collected information, at least one graphical presentation associated with the plurality of sites, the at least one presentation comprising one or more respective selectable status indicators associated with each of the plurality of sites. The method can also include outputting, by the monitoring system, the generated at least one presentation.

In one aspect of an embodiment, the computer-implemented method can further include receiving, by the monitoring system, a user selection of a status indicator. The method can also include generating, by the monitoring system based at least in part upon the received user selection, a presentation comprising detailed information associated with the selected status indicator. The method can further include outputting, by the monitoring system, the generated presentation comprising detailed information.

In another embodiment, a system can be provided. The system can include at least one processor operable to execute one or more computer-executable instructions. The system can also include at least one memory operable to store the one or more computer-executable instructions. The instructions can be operable to: collect status information associated with a plurality of sites monitored by a security service provider; generate, based at least in part upon the collected information, at least one graphical presentation associated with the plurality of sites, the at least one presentation comprising one or more respective selectable status indicators associated with each of the plurality of sites; and output, by the monitoring system, the generated at least one presentation.

In one aspect of an embodiment, the instructions can be further operable to: receive a user selection of a status indicator; generate, based at least in part upon the received user selection, a presentation comprising detailed information associated with the selected status indicator; and output the generated presentation comprising detailed information.

Other embodiments, features, and aspects of the disclosure may be apparent in view of the below drawings and detailed description.

BRIEF DESCRIPTION OF THE DRAWINGS

Reference will now be made to the accompanying drawings, which are not necessarily drawn to scale, and wherein.

DETAILED DESCRIPTION

Figure 1:
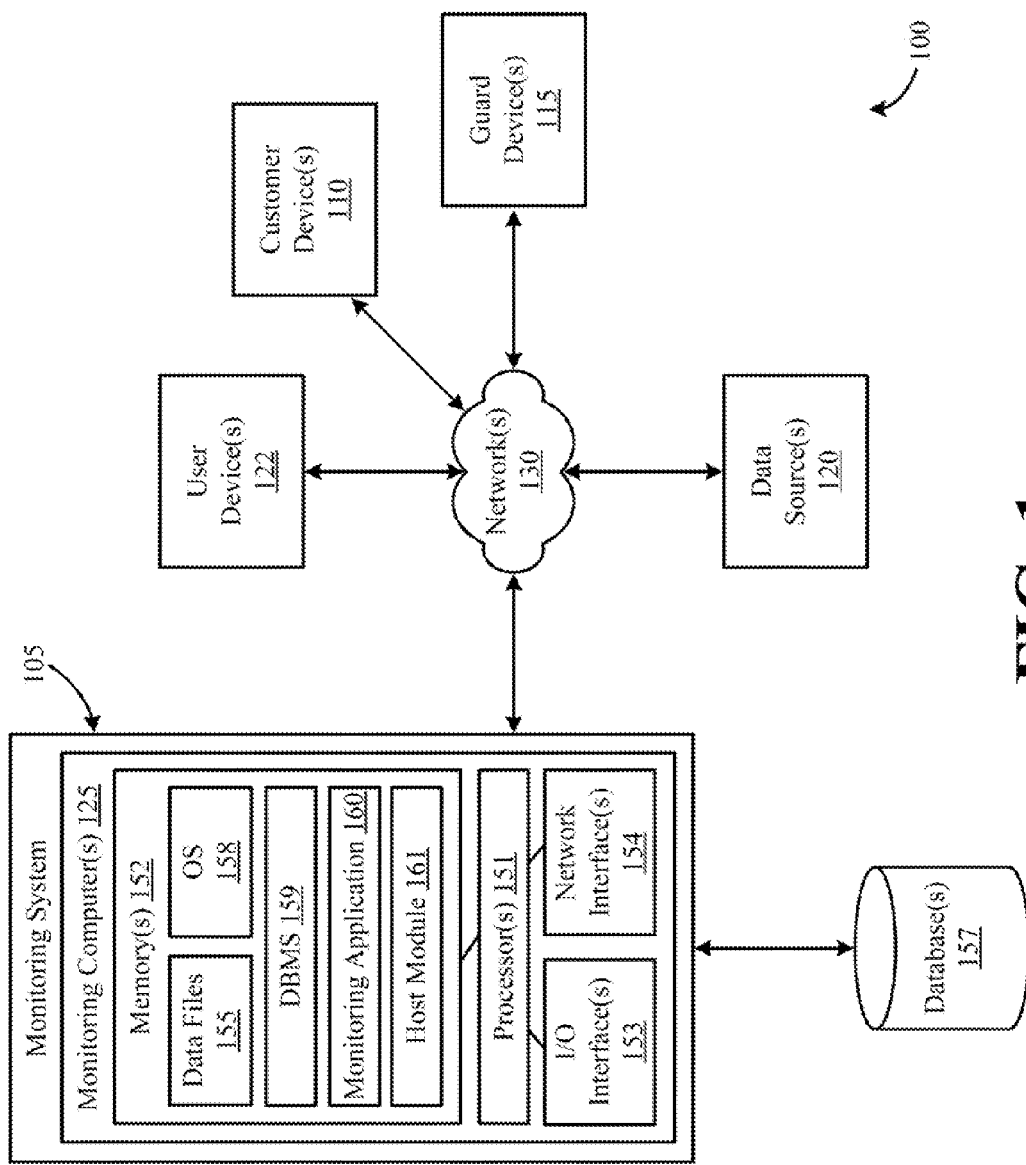
FIG. 1 illustrates a block diagram of an example overview of a system that may facilitate the management of security data, according to an example embodiment of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may include systems, methods, and apparatus for monitoring security data, such as data associated with a plurality of monitored sites. In one example embodiment, data associated with any number of monitored sites may be collected. A wide variety of different types of data may be collected as desired including, but not limited to, data associated with security guards assigned to each site (e.g., consent form data, criminal record data, immigration eligibility data, criminal record check data, drug testing data, etc.), training data associated with the security guards (e.g., first aid training data, CPR training data, etc.), data associated with the monitoring of the site (e.g., identified fault data, security alert data, etc.), and/or data associated with a relationship between a security company and one or more customers for which monitoring services are provided (e.g., invoice data, personnel retention data, data associated with scheduled reviews and/or review meetings, compliance data, etc.). As desired, data may be collected from a wide variety of different sources, such as customer devices, guard devices (e.g., communicators utilized during a guard tour, etc.), and/or various systems associated with the security company.

Once data has been collected and/or processed, a monitoring system may generate a wide variety of suitable presentations associated with the collected data. For example, in certain embodiments, a suitable dashboard presentation or overview presentation (e.g., a "Security At A Glance" presentation, etc.) may be generated. The dashboard presentation may include information associated with any number of monitored sites. For example, a dashboard presentation may include information associated with all of the sites monitored by a security company. As another example, a dashboard presentation may include information associated with all of the monitored sites associated with specific clients of the security company. Additionally, a dashboard presentation may be communicated to and/or accessible by a wide variety of different entities. For example, security company personnel and/or customers of the security company may utilize any number of suitable user devices to view a dashboard presentation. As desired, any number of authentication and/or security techniques (e.g., authenticated log-in, digital certificates, etc.) may be evaluated prior to granting access to a dashboard presentation. In certain embodiments, the authentication may also facilitate the determination of access rights to various types of data that may be included in the dashboard presentation.

As desired, a dashboard presentation may include status information associated with a wide variety of different types of data. For example, respective status information associated with any number of evaluated factors or parameters may be included for a plurality of different monitored sites. In certain embodiments, visual indicators may be provided in order to represent a current status for different factors. For example, a green indicator may indicate that no problem exists with respect to the evaluated factor, a yellow indicator may provide a caution indication (e.g., an indication that a problem might exist, etc.), and/or a red indicator may indicate that action is required or that a problem has been identified (e.g., data is not available, required data has not been acquired, a required action has not been taken, an alert has been triggered, etc.). In this regard, a user may be presented with a presentation that permits a relatively quick assessment of various security data. Additionally, the user may be permitted to select an indicator in order to obtain more detailed information relating to the indicator.

System Overview

An example system 100 that facilitates the monitoring of security data will now be described illustratively with respect to FIG. 1. As shown in FIG. 1, the system 100 may include at least one monitoring system 105 and/or any number of other devices configured to communicate with the monitoring system 105, such as one or more customer devices 110, one or more security guard devices 115, one or more data sources 120, and/or one or more user devices 122. As desired, the monitoring system 105 may include any number of monitoring computers 125 and/or other computing devices. Similarly, other components of the system 100 may include any number of suitable computers and/or processor-driven devices. Additionally, the various components of the system 100 may be in communication with one another via any number of suitable networks 130.

Generally, network devices and systems, including one or more of the monitoring computers 125, the customer devices 110, the guard devices 115, the data sources 120, and/or the user devices 122, may include or otherwise be associated with suitable hardware and/or software for transmitting and receiving data, signals, and/or computer-executable instructions over one or more communications links or networks. As desired, these network devices and systems may also include any number of processors for processing data and executing computer-executable instructions, as well as other internal and peripheral components that are well-known in the art. Further, these network devices and systems may include or may be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the monitoring system 105 may include any number of monitoring computers 125 or other processor-based devices that are configured to receive information associated with monitored security sites and to utilize at least a portion of the received information to generate one or more presentations, such as a dashboard presentation and/or presentation that illustrates detailed information. In certain embodiments, the monitoring system 105 may be associated with a service provider that provides security services. For example, the monitoring system 105 may be associated with a security company that provides security guard services in order to monitor any number of client or customer locations. In other embodiments, the monitoring system 105 may be associated with a service provider that processes data on behalf of various security companies.

Each monitoring computer 125 may be any suitable processor-driven device that facilitates the collection and/or processing of information associated with customers of a security service provider and/or the monitoring of customer locations. For example, a monitoring computer 125 may be a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of the computer-implemented instructions by the monitoring computer 125 may form a special purpose computer or other particular machine operable to facilitate the collection and processing of security data in order to generate and communicate one or more graphical presentations and/or displays, such as a dashboard display and/or any number of detailed displays. Additionally, in certain embodiments of the disclosure, the operations and/or control of a monitoring computer 125 may be distributed among several processing components.

In addition to having one or more processors 151, the monitoring computer 125 may include one or more memory devices 152, one or more input/output ("I/O") interface(s) 153, and/or one or more network interface(s) 154. The memory devices 152 may be any suitable memory devices, for example, caches, read-only memory devices, random access memory devices, magnetic storage devices, removable storage devices, etc. The memory devices 152 may store data, executable instructions, and/or various program modules utilized by the monitoring computer 125, for example, data files 155, one or more databases 157, an operating system ("OS") 158, a database management system ("DBMS") 159, a monitoring application 160, and/or one or more host modules 161. The data files 155 may include any suitable data that facilitates the collection of security data, the processing of security data, the generation of one or more presentations, the processing of commands associated with the presentations, and/or the communication of presentations to other components of the system 100. For example, the data files 155 may include, but are not limited to, information associated with establishing communication with other components of the system 100 (e.g., the customer devices 110, the guard devices 115, the data sources 120, the user devices 122, etc.), presentation preferences and/or parameters associated with customers of the security service provider, information associated with monitoring requirements and/or security guard requirements (e.g., training requirements, background check requirements, etc.), monitoring information collected from the guard devices 115, billing and/or invoice information, information associated with the generation of presentations, and/or information associated with processing user requests associated with presentations. The databases 157 may include any other data utilized by the monitoring computer 125 as desired in various embodiments of the disclosure. For example, the databases 157 may include similar information as that described above as being included in the data files 155, such as customer preference information and/or monitoring information. Indeed, information may be stored in a wide variety of suitable devices and/or forms.

The OS 158 may be a suitable software module that controls the general operation of the monitoring computer 125. The OS 158 may also facilitate the execution of other software modules by the one or more processors 151, for example, the DBMS 159, the monitoring application 160, and/or the host module 161. The OS 158 may be, but is not limited to, Microsoft Windows®, Apple OSX™, Linux, Unix, or a mainframe operating system. The DBMS 159 may be a suitable software module that facilitates the management of stored information and/or data files, such as information stored in the databases 157. The host module 161 may facilitate the receipt and/or processing of requests communicated to the monitoring computer 125 by one or more of the other components of the system 100, such as the customer devices 110 and/or the user devices 122. For example, a host module 161 may facilitate the establishment of a communications session with another component of the system 100 to facilitate the transmission of information. As one example, a host module 161 may facilitate the establishment of a communications session with another device (e.g., a personal computer, a mobile device, a tablet, etc.), such as a Web-based session, in order to communicate one or more graphical presentations to the other device.

The monitoring application 160 may include any number of suitable software modules and/or applications that facilitate the collection and/or processing of security data or security information. In operation, the monitoring application 160 may collect a wide variety of information associated with monitored sites, employees of a security service provider, and/or customers of the service provider. Examples of suitable information that may be collected include, but are not limited to, employee (e.g., security guards, etc.) information, employee training information, employee background check information, customer location (i.e., monitored sites) information, customer billing and/or invoice information, customer interaction information, customer review information, monitoring information associated with security monitoring (e.g., guard tours, etc.), and/or any alert information. The information may be collected from a wide variety of different sources, such as directly from the customer devices 110, the guard devices 115, and/or the data sources 120. For example, security monitoring information may be collected from the guard devices 115. As another example, employee training information may be collected from a data source 120 that manages training information. In certain embodiments, information may be collected by the monitoring application 160 in real time or near real time. In this regard, a relatively accurate current status of a monitored site and/or a plurality of monitored sites may be determined by the monitoring system 105.

Once information has been collected (or otherwise determined or identified), the monitoring application 160 may generate one or more presentations based upon the collected information. For example, an overview or dashboard presentation, such as the dashboard presentation illustrated in FIG. 2A, may be generated. As desired in certain embodiments, certain presentations may be interactive presentations (e.g., a Web page, other interactive presentation, etc.) that facilitate the selection of individual indicators and/or items of information. For example, a pointer (e.g., a mouse pointer, etc.) may be positioned over an indicator included in a dashboard presentation and/or utilized to actively select (e.g., click on, etc.) an indicator. Based upon a selection or other user indication of an indicator, a wide variety of detailed information associated with the selected indicator may be collected, generated, and presented. For example, detailed information may be presented in one or more pop-up windows and/or one or more additional windows. A wide variety of detailed information may be presented as desired in various embodiments of the disclosure including, but not limited to, detailed information associated with one or more criteria and/or parameters that are monitored in association with a monitored site. One example of a detailed presentation is described in greater detail below with reference to FIG. 2B.

One example of the operations of the monitoring application 160 is described in greater detail below with reference to FIG. 3. Additionally, a few example presentations that may be generated by the monitoring application 160 are described in greater detail below with reference to FIGS. 2A and 2B.

The one or more I/O interfaces 153 may facilitate communication between the monitoring computer 125 and one or more input/output devices, for example, one or more user interface devices, such as a display, keypad, control panel, touch screen display, remote control, microphone, etc., that facilitate user interaction with the monitoring computer 125. The one or more network interfaces 154 may facilitate connection of the monitoring computer 125 to one or more suitable networks, for example, the networks 130 illustrated in FIG. 1. In this regard, the monitoring computer 125 may receive and/or communicate information to other network components of the system 100, such as the customer devices 110, the guard devices 115, the data sources 120, and/or the user devices 122.

With continued reference to FIG. 1, any number of customer devices 110 may be provided. Each customer device 110 may include a wide variety of different computers, computing systems, and/or processor-based devices. Each customer device 110 may be a suitable processor-driven device that includes components similar to those described above for the monitoring computer 125, such as memory devices, processors, I/O interfaces, and/or network interfaces. In operation, the various customer devices 110 may facilitate the provision of customer-related information to the monitoring system 105, such as customer preferences and/or parameters associated with information to include in presentations, the organization of presentations, the generation of selectable indicators, various status levels for the indicators (e.g., green, yellow, red, etc.), thresholds for determining status, the generation of alert messages, access rights of various users associated with the customer, information to be included in detailed presentations, and/or any other suitable data.

Additionally, any number of suitable guard devices 115 may be provided. In certain embodiments, a guard device 115 may be a suitable "communicator" device that facilitates the electronic collection of data associated with a guard tour. Certain guard devices 115 may be suitable processor-driven devices (e.g., mobile devices, etc.) configured to collect monitoring data and provide the collected data to the monitoring system 105 and/or to any number of data sources 120. Other guard devices 115 (e.g., a wand device, etc.) may collect data that is later downloaded to another device or system in communication with the monitoring system 105. In operation, a guard may utilize a guard device 115 to gather security data (e.g., data associated with locations or checkpoints on a guard tour, timing data, identified alert data, abnormal conditions data) during a guard tour, and the collected data may be communicated to the monitoring system 105 for processing.

Additionally, any number of data sources 120 may be provided as desired in various embodiments. Each data source 120 may be a suitable processor-driven device that includes components similar to those described above for the monitoring computer 125. For example, each data source 120 may include one or more memory devices, one or more processors, one or more I/O interfaces, and/or one or more network interfaces. In operation, a data source 120 may be configured to collect and/or store a wide variety of security-related information. Examples of security-related information that may be stored include, but are not limited to, security monitoring information, employee information, invoice information, etc. The data source 120 may additionally be configured to communicate at least a portion of the collected data to the monitoring system 105. For example, the data source 120 may return data to the monitoring system 105 in response to one or more requests for the data. As another example, the data source 120 may push data to the monitoring system 105 either periodically (e.g., hourly, daily, etc.) or upon the detection of one or more predetermined conditions.

As desired in various embodiments, any number of user devices 122 may also be provided. Each user device 122 may be a suitable processor-driven device that includes components similar to those described above for the monitoring computer 125. For example, each user device 122 may include one or more memory devices, one or more processors, one or more I/O interfaces, and/or one or more network interfaces. Examples of suitable user devices 122 include, but are not limited to, personal computers, mobile devices, tablet devices, and/or other devices that facilitate communication with the monitoring system 105. In operation, a user, such as a security service provider employee or a customer of the service provider, may utilize a user device 122 to establish a communications session with a monitoring computer 125. For example, a host module 161 (e.g., a Web server, etc.) may be accessed by the user device 122. In certain embodiments, authentication credentials (e.g., user name and password, digital certificates, encryption keys, etc.) may be communicated to the monitoring computer 125 during the establishment of a communications session, and the authentication credentials may be evaluated in order to determine whether a communications session should be established and/or access rights of a user. Once a communications session has been established, one or more graphical user interfaces and/or presentations associated with the monitored sites may be requested utilizing the user device 122. In response to the requests, various presentations may be communicated to the user device 122 and output by the user device 122 for presentation to the user.

The networks 130 may include any number of telecommunication and/or data networks, whether public, private, or a combination thereof, including a local area network, a public switched telephone network, a cellular network, a wide area network, an intranet, the Internet, intermediate handheld data transfer devices, and/or any combination thereof and may be wired and/or wireless. For example, the networks 130 may be any suitable data networks, such as the Internet, a cellular network, and/or another network, that facilitate communication of security information and/or presentations between the various components of the system 100.

Due to network connectivity, various methodologies as described herein may be practiced in the context of distributed computing environments. Additionally, a wide variety of network configurations is possible. As desired, a plurality of networks may be provided, each with devices such as gateways and routers for providing connectivity between or among networks. Instead of or in addition to one or more networks, dedicated communication links may be used to connect certain devices in accordance with an example embodiment of the disclosure.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Example Graphical Presentations

A wide variety of different graphical user interfaces and/or presentations may be utilized as desired in various embodiments of the disclosure. These presentations may be generated by a monitoring system, such as the monitoring system 105 illustrated in FIG. 1, based at least in part upon collected security data and/or information associated with one or more monitored sites. In certain embodiments, a plurality of presentations may be associated with one another. For example, interactive presentations may be generated, and user selections associated with a first presentation may be processed in order to facilitate the generation and/or communication of additional presentations. As one example, a first presentation may provide information associated with a plurality of monitored sites. Selection of a monitored site may lead to the communication of one or more presentations associated with the monitored site. Similarly, selection of an indicator included in the presentation may lead to the communication of one or more detailed presentations associated with the selected indicator.

Figure 2A:
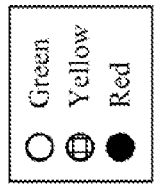
FIG. 2A is a depiction of an example dashboard or overview display that may be generated in accordance with various embodiments of the disclosure.

FIG. 2A is a depiction of an example dashboard 200 or overview display that may be generated in accordance with various embodiments of the disclosure. With reference to FIG. 2A, the dashboard 200 may provide an overview of the status of a wide variety of monitored sites. For example, an overview of the monitored sites associated with a customer of a service provider may be included in the dashboard 200. Additionally, for each monitored site, a wide variety of different information may be provided. As illustrated in FIG. 2A, a plurality of indicators may be provided for each of the monitored sites. Additionally, as desired, indicators may be provided for an aggregation of all of the monitored sites. Each indicator may provide a status for a respective aspect or parameter associated with each respective monitored site.

A wide variety of suitable indicators may be included in the dashboard. For example, with reference to FIG. 2A, indicators may be utilized to provide data associated with the execution of security guard consent forms prior to working at a monitored location, the evaluation of a criminal record for the security guards working at the monitored location, the immigration eligibility or status of security guards who are not U.S. citizens, the annual evaluation of a criminal record for the security guards, drug testing for the security guards, the completion of annual first aid training for the security guards, the completion of annual CPR training for the security guards, the security status of a monitored site and whether or not a significant fault or alert condition has been identified, the accuracy of invoices prepared for the monitored site, personnel retention for the monitored site, the completion of a quarterly review meeting regarding the monitored site, and/or uniform compliance associated with the monitored site.

Additionally, a wide variety of different statuses may be represented by an indicator. For example, a green indicator may indicate that no problems exist with respect to the evaluated factor associated with the indicator, a yellow indicator may provide a caution indication (e.g., an indication that a problem might exist, etc.), and/or a red indicator may indicate that action is required or that a problem has been identified (e.g., data is not available, required data has not been acquired, a required action has not been taken, an alert has been triggered, etc.). Other statuses may be utilized as desired.

As desired, a wide variety of suitable threshold conditions and/or client preferences may be utilized to establish the conditions for establishing the indicator statuses. For example, with respect to the indicators for the consent forms, if all of the security guards have executed consent forms, then a green indicator status may be set. If a portion of the guards have executed consent forms, then a yellow or caution indicator status may be set. If none of the guards have executed consent forms, then a red indicator status may be set. As another example, with respect to drug testing, a green indicator status may be set if drug tests have been performed and passed, a yellow indicator may be set if drug tests have not been performed, and a red indicator may be set if scheduled drug tests have not been performed (i.e., not performed within a prescribed period of time) or if one or more drug tests have been failed. As yet another example, with respect to the first aid indicator, a green status may be set if all of the guards have completed annual first aid training, a yellow status may be set if only a portion of the guards have completed the training (or if a portion of the guards have failed one or more training exams), and a red status may be set if the training was not provided or if all (or a majority or greater than a threshold value) of the guards have not completed or passed the training. Indeed, a wide variety of different statuses and indicators may be provided as desired. In this regard, the dashboard 200 may permit a relatively quick assessment of various security data.

Additionally, in certain embodiments, a user to whom the dashboard 200 is presented may be permitted to select an indicator in order to obtain more detailed information relating to the indicator. Based upon the selection of an indicator, one or more presentations including detailed information about the selected indicator may be generated and communicated to a user device for presentation to the user. For example, if the invoice accuracy indicator is selected for illustrated Site 4, then detailed invoice and/or billing information may be presented for the site. In this regard, a user may view any invoice inconsistencies or errors. For example, the user may determine that an invoice is overdue or that an invoice needs to be revised. Although detailed presentations are described as being generated in association with specific combinations of indicators and monitored sites, detailed presentations may also be generated for multiple indicators associated with a particular monitored site and/or may include indicator data across a plurality of monitored sites. Indeed, a wide variety of different types of presentations may be prepared as desired in various embodiments of the disclosure.

Figure 2B:
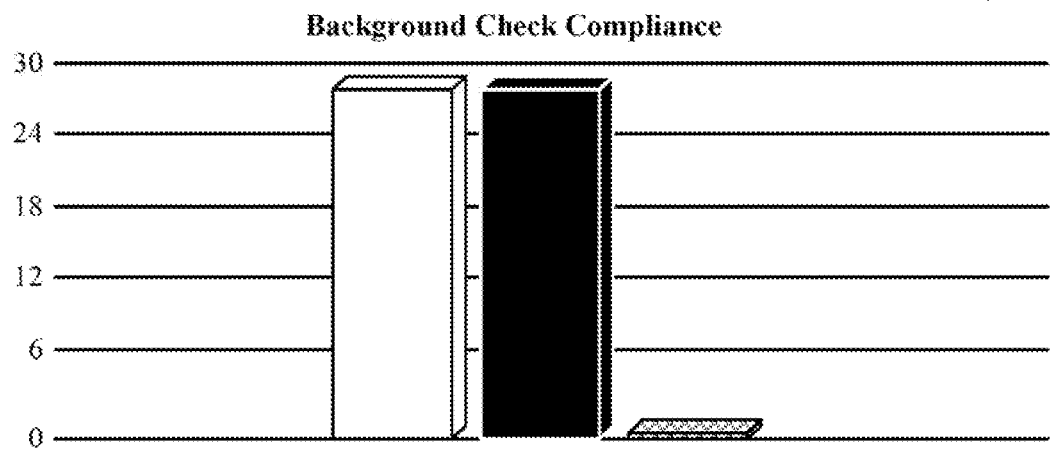
FIG. 2B is a depiction of an example detailed display that may be generated in accordance with various embodiments of the disclosure.

FIG. 2B is a depiction of an example detailed display or presentation 250 that may be generated in accordance with various embodiments of the disclosure. In certain embodiments, the detailed display 250 may be generated based upon a user selection of an indicator included in a dashboard display, such as the dashboard 200 illustrated in FIG. 2A. For example, the detailed display 250 illustrated in FIG. 2B may be generated based upon a user selection of a consent form indicator illustrated in the dashboard 200. The detailed display 250 may include a wide variety of detailed information associated with consent form compliance. For example, identifying information (e.g., name, employee number, office number, etc.) may be included for the personnel (e.g., security guards, etc.) assigned to a particular location. Additionally, a respective indicator may be provided for each individual in order to indicate whether an adequate consent form has been obtained for each individual. As desired, a wide variety of suitable charts, graphs, and/or other visual indicators may be provided. For example, as illustrated in FIG. 2B, a suitable graph may illustrate a total number of employees or personnel, a number of employees in compliance with the consent form requirements, and/or a number of employees not in compliance with the consent form requirements.

A wide variety of suitable information may be included in a detailed display as desired in various embodiments. Additionally, a wide variety of different types of detailed displays may be generated as desired. The detailed display illustrated in FIG. 2B is provided by way of example only.

Operational Overview

Figure 3:
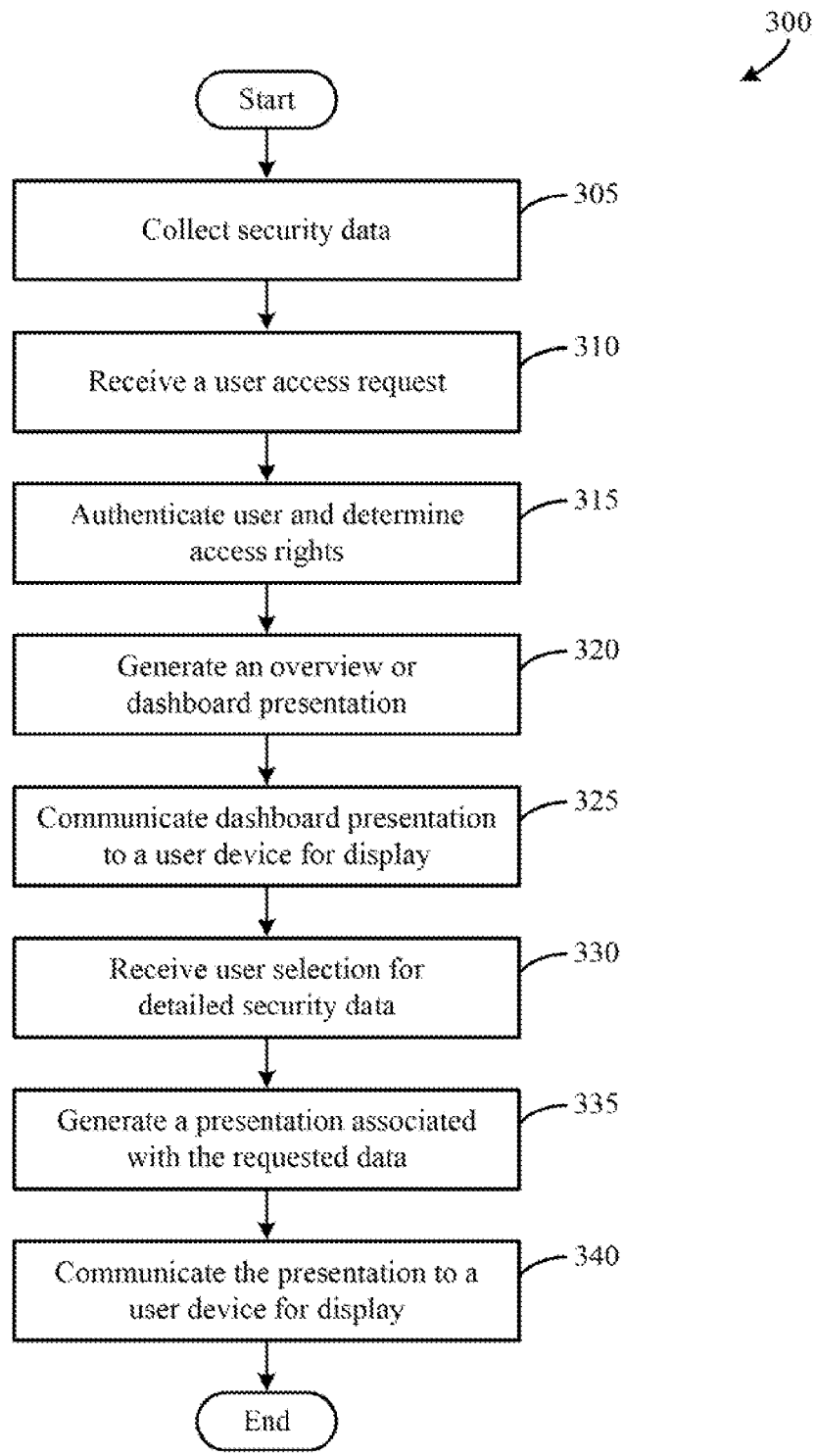
FIG. 3 is a flow diagram of an example method for generating one or more presentations associated with collected security data, according to an illustrative embodiment of the disclosure.

FIG. 3 is a flow diagram of an example method 300 for generating one or more presentations associated with collected security data, according to an illustrative embodiment of the disclosure. In certain embodiments, the operations of the method 300 may be performed by a suitable monitoring system and/or monitoring application, such as the monitoring system 105 and/or the monitoring application 160 illustrated in FIG. 1. The method 300 may begin at block 305.

At block 305, security data may be collected for any number of locations and/or sites monitored by security guards and/or other personnel associated with a security service provider. As set forth in greater detail above with reference to FIG. 1, a wide variety of different types of security data may be collected from any number of suitable sources.

At block 310, a user access request may be received. For example, a user request to access a Web server and/or other suitable device in order to receive security information may be received from a user device, such as the user device 122 illustrated in FIG. 1. In certain embodiments, a wide variety of authentication information may be received in association with the user request, such as a user name and password (i.e., login information, etc.). At block 315, a user associated with the user request may be authenticated, and access rights for the user may be determined. For example, login information may be utilized to identify and validate a requesting user. As another example, other authentication information (e.g., digital certificates, etc.) may be utilized to authenticate a user device 122 from which a request originated. Additionally, based upon an identity of the requesting user, a wide variety of permission levels and/or access rights may be determined for the user. For example, monitored sites and/or the types of security data that the user is permitted to view may be determined.

At block 320, an overview or dashboard presentation, such as the dashboard 200 illustrated in FIG. 2A may be generated. As desired, the access rights and/or permission levels for the user may be taken into account during the generation of the dashboard. For example, monitored sites associated with the user and/or for which the user has access rights may be identified for inclusion in the generated dashboard. As another example, various indicators and/or monitoring parameters for each of the monitored sites may be identified based upon user access rights. Once the dashboard presentation has been generated, the dashboard presentation may be communicated to a user device 122 via any number of suitable networks at block 325. In this regard, the dashboard presentation may be output by the user device 122 for display or presentation to the user.

During the evaluation of the dashboard presentation, the user may select a wide variety of selectable indicators included in the dashboard presentation. For example, the user may select an indicator included in the dashboard presentation. In this regard, a request for detailed security data associated with the indicator may be communicated to the monitoring system 105 by the user device 122, and the request may be received by the monitoring system 105 at block 330. At block 335, a presentation associated with the requested detailed data may be generated, and the generated presentation may be communicated to the user device 122 at block 340. In this regard, the detailed information may be presented to the user by the user device 122.

The method 300 may end following block 340.

The operations described and shown in the method 300 of FIG. 3 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 3 may be performed.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method, comprising:
   collecting, by a monitoring system comprising one or more computers, status information associated with a plurality of sites monitored by a security service provider;
   determining, by the monitoring system, a selectable status indicator for each of a plurality of sites and a plurality of factors associated with actions performed by guards at each of the sites, the actions associated with consent form compliance, testing compliance, eligibility compliance, and training compliance for the guards, wherein determining the selectable status indicators comprises:
      comparing a first number of the actions performed by the guards to a respective predetermined threshold value associated with the actions;
      determining, based at least in part on the comparison, a first selectable status indicator of the selectable status indicators when a portion of the guards have performed an action; and
      determining, based at least in part on the comparison, a second selectable status indicator of the selectable status indicators when all of the guards have performed the action;
   generating, by the monitoring system based at least in part upon the collected information, at least one graphical presentation comprising the selectable status indicators for the plurality of sites and the plurality of factors;
   outputting, by the monitoring system, the generated at least one graphical presentation;
   collecting, by the monitoring system from a guard device used by at least one guard of the guards during a guard tour, additional status information comprising statuses associated with the actions performed by the guards during the guard tour;

determining, by the monitoring system, a second number of the actions performed by the guards based at least in part on the additional status information; and adjusting, by the monitoring system, at least one of the first or the second selectable status indicators based at least in part on a comparison of the second number of the actions to the predetermined threshold value.

2. The computer-implemented method of claim 1, further comprising:

receiving, by the monitoring system, a user selection of a selectable status indicator;

generating, by the monitoring system based at least in part upon the received user selection, a presentation comprising detailed information associated with the selected selectable status indicator; and outputting, by the monitoring system, the generated presentation comprising detailed information.

3. The computer-implemented method of claim 1, wherein one or more of the selectable status indicators correspond to a respective request for predefined security data.

4. The computer-implemented method of claim 1, wherein at least one of the selectable status indicators is further associated with security guard data.

5. The computer-implemented method of claim 1, wherein at least one selectable status indicator corresponds to invoice accuracy, and the method further comprises:

receiving a selection of the at least one selectable status indicator; and providing invoice or billing information corresponding to the selected selectable status indicator.

6. The computer-implemented method of claim 1, wherein at least one selectable status indicator corresponds to consent form compliance, and the method further comprises:

receiving a selection of the at least one selectable status indicator; and providing identifying information corresponding to one or more personnel.

7. The computer-implemented method of claim 1, wherein each of the plurality of sites comprises respective locations monitored by the security service provider.

8. The computer-implemented method of claim 1, further comprising:

transmitting the generated at least one presentation to one or more user devices associated with an entity associated with a respective location monitored by the security service provider.

9. The computer-implemented method of claim 1, further comprising:

receiving the status information from at least one of a customer device, a data storage device, a memory, or a device associated with the security service provider.

10. The computer-implemented method of claim 1, further comprising:

restricting output of the collected status information based at least in part on user access rights or location access rights.

11. A system, comprising:

at least one processor operable to execute one or more computer-executable instructions; and at least one memory operable to store the one or more computer-executable instructions; the instructions operable to:

collect status information associated with a plurality of sites monitored by a security service provider;

determine a selectable status indicator for each of a plurality of sites and a plurality of factors associated with actions performed by guards at each of the sites, the actions associated with consent form compliance, testing compliance, eligibility compliance, and training compliance for the guards, wherein the determination comprises:

comparing a first number of the actions performed by the guards to a respective predetermined threshold value associated with the actions;

determining, based at least in part on the comparison, a first selectable status indicator of the selectable status indicators when a portion of the guards have performed an action; and determining, based at least in part on the comparison, a second selectable status indicator of the selectable status indicators when all of the guards have performed the action;

generate, based at least in part upon the collected information, at least one graphical presentation associated with the plurality of sites, the at least one presentation comprising one or more respective selectable status indicators associated with each of the plurality of sites;

output, by the monitoring system, the generated at least one graphical presentation;

collect, from a guard device used by at least one guard of the guards during a guard tour, additional status information comprising statuses associated with the actions performed by the guards;

determine a second number of the actions performed by the guards based at least in part on the additional information; and adjust at least one of the first or the second selectable status indicators based at least in part on a comparison of the second number of the actions to the predetermined threshold value.

12. The system of claim 11, wherein the instructions are further operable to:

receive a user selection of a selectable status indicator;

generate, based at least in part upon the received user selection, a presentation comprising detailed information associated with the selected selectable status indicator; and output the generated presentation comprising detailed information.

13. The system of claim 11, wherein one or more of the selectable status indicators correspond to a respective request for predefined security data.

14. The system of claim 11, wherein at least one of the selectable status indicators is further associated with security guard data.

15. The system of claim 11, wherein at least one selectable status indicator corresponds to invoice accuracy, and the instructions are further operable to:

receive a selection of the at least one selectable status indicator; and provide invoice or billing information corresponding to the selected selectable status indicator.

16. The system of claim 11, wherein at least one selectable status indicator corresponds to consent form compliance, and the instructions are further operable to:

receive a selection of the at least one selectable status indicator; and provide identifying information corresponding to one or more personnel.

17. The system of claim 11, wherein each of the plurality of sites comprises respective locations monitored by the security service provider.

18. The system of claim 11, wherein the instructions are further operable to:
    transmit the generated at least one presentation to one or more user devices associated with an entity associated with a respective location monitored by the security service provider.

19. The system of claim 11, wherein the instructions are further operable to:
    receive the status information from at least one of a customer device, a data storage device, a memory, or a device associated with the security service provider.

20. The system of claim 11, wherein the instructions are further operable to:
    restrict output of the collected status information based at least in part on user access rights or location access rights.

* * * * *